United States Patent [19]
Fadeev et al.

[11] Patent Number: 4,884,642
[45] Date of Patent: Dec. 5, 1989

[54] PERCUSSIVE ACTION MACHINE

[75] Inventors: Petr Y. Fadeev; Vladimir Y. Fadeev; Vladlen V. Korobkov; Rim A. Kulagin; Nikolai P. Ermilov, all of Novosibirsk, U.S.S.R.

[73] Assignee: Institut Gidrokinamiki Im, Lavrentieva, Novosibirsk, U.S.S.R.

[21] Appl. No.: 266,630

[22] PCT Filed: Dec. 24, 1986

[86] PCT No.: PCT/SU86/00141

§ 371 Date: Aug. 24, 1986

§ 102(e) Date: Aug. 24, 1986

[87] PCT Pub. No.: WO88/05115

PCT Pub. Date: Jul. 14, 1988

[51] Int. Cl.[4] .................................... B23B 45/16
[52] U.S. Cl. .................................... 173/139; 173/134; 173/133; 92/85 B
[58] Field of Search .............. 173/139, 132, 133, 134, 173/128, 1; 92/85 B

[56] References Cited

U.S. PATENT DOCUMENTS 4,343,368 8/1982 Fadeev et al. .
4,476,941 10/1984 Buck et al. .................... 173/139 X
4,624,325 11/1986 Steiner .............................. 173/139

FOREIGN PATENT DOCUMENTS 2223292 6/1978 Fed. Rep. of Germany .
583291 12/1977 U.S.S.R. .
945412 7/1982 U.S.S.R. .
10002563 3/1983 U.S.S.R. .

*Primary Examiner*—Frank T. Yost
*Assistant Examiner*—Willmon Fridie, Jr.
*Attorney, Agent, or Firm*—Fleit, Jacobson, Cohn, Price, Holman & Stern

[57] ABSTRACT

A percussive action machine for changing the shape of solids objects comprises a housing (1) accommodating a hammer (2) capable of reciprocations. A tail piece (3) of the hammer (2) is disposed inside a power cylinder (6) to impart energy thereto during the work stroke of the hammer, the tail piece being capable of engagement with a drive for executing the return stroke of the hammer (2). The machine is also provided with a unit for decelerating the forward travel of the hammer (2) in the form of an annular projection (20) in the midportion of the hammer (2), and a cavity (17) which accommodates this projection (20), and has a hammer deceleration chamber (21) of a cross-section substantially equal to the cross-section of the projection (20). The side surface of either the hammer decleration chamber (21) or the annular projection (20) is tapered.

3 Claims, 2 Drawing Sheets

PERCUSSIVE ACTION MACHINE

FIELD OF THE INVENTION

This invention relates to power pulse systems intended to generate power pulses of desired frequency and intensity and act on a solid medium with the aim of shape changing, and more particularly to percussive action devices for producing high power impact pulses.

This invention can find application in mining, for example, in machines for working drifts in hard rock formations, and in machines for crushing outsize rocks in open pits and mouths of grinders.

The machine according to the invention can also be used in metallurgy for initially crushing raw materials, intermediate products, and industrial refuse.

Other alternative applications include civil engineering, such as in machines for demolishing foundations and walls of old buildings, crushing reject products at concrete plants, ripping up concrete road pavings, preparing rocky beds of dams or other water-works, and elsewhere.

BACKGROUND OF THE INVENTION

There is known a percussive action machine (cf., U.S. Pat. No. 4,343,368, Int. Cl. B 25 D 9/04, published Oct. 8, 1982) for producing impact pulses to crush solid objects comprising a housing, a hammer with a tail piece, a power cylinder accommodating the tail piece of the hammer and filled with a compressed gas, a mechanism for reversing the movement of the hammer, and a means for decelerating the travel of the hammer as it executes an idle stroke including a cavity inside the housing opening at one side toward the interior of the power cylinder, and a cylindrical body having piston and annular projections and disposed inside said cavity for reciprocations therein. Part of the cavity confined between the annular and piston projections forms a hammer-deceleration chamber, and is filled with a non-compressible liquid; inner surfaces of the housing defining the deceleration chamber have an annular flow restricting projection, whereas the surface of the cylindrical body between such projections has a special configuration providing continuity of the deceleration force acting on the hammer. The other part of said cavity confined by the piston projection of the cylindrical body is filled with the compressed gas and forms a return stroke chamber.

The return and work strokes of the hammer are accompanied by additional compression of the gas present in the power cylinder to store potential energy, whereas at the end of the return stroke the hammer is released from the return stroke mechanism, and under the action of the compressed gas exerted on the end face of the tail piece the hammer accelerates to execute a work stroke, after which the hammer again engages with the return stroke mechanism, and the hammer moves in the reverse direction. During an idle stroke, that is when the hammer at the end of the work stroke fails to meet a solid object to be crushed, or fails to expend all its energy to change the shape of this object, the hammer deceleration means is brought into action. Therewith, the hammer is caused to engage with the cylindrical body to move it forward, whereby the flow of liquid in the hammer deceleration chamber through a clearance between the annular projection and shaped surface of the cylindrical body is restricted, and the energy of the hammer is transformed to heat energy of the liquid to be dissipated.

The machine is provided with a hammer deceleration means, which effectively damps the residual energy of the hammer during an idle stroke thereof. However, after extensive use of the machine, elements of the hammer deceleration means tend to wear out to result in inadvertent collisions between the elements of the deceleration means and hammer, and subsequent failure of the machine.

There is further known a hydraulically operated percussive action machine (cf., West German Patent No. 2,223,292, Int. Cl. B 25 D 17/24, published June 8, 1978) having a hammer piston capable of reciprocations inside a housing of the machine to execute work and return strokes. The housing of the machine has a chamber in which the liquid under pressure acts on the hammer piston for the piston to execute a return stroke. The hammer piston is provided with an annular collar accommodated in said chamber, the front portion of this chamber acting as a damping or shock-absorbing means. The same pressure of liquid in the chamber acts on both end faces of the collar until the collar is outside the damping chamber. The machine also has a valve, which ensures a switchover of the liquid from feeding to discharge for the hammer to execute return and work strokes.

The work stroke is executed by the piston under the force of pressure of the working liquid on its rear end face, whereas the return stroke is executed by the pressure of liquid on the excess surface area of the hammer inside said chamber. When the hammer piston runs excessively over the length of its normal work stroke, the annular collar enters the damping chamber for the pressure of liquid to grow sharply therein, and by acting on the front end of the annular collar against the path of travel of the hammer piston tends to stop the latter. In this manner collision of the hammer piston with the housing of the apparatus is prevented.

The aforedescribed prior art machine operates reliably at low energy of impacts, for example, when used as a hand tool. Higher impact energy entails difficulties associated with displacing the working liquid from the chamber in the cource of the work stroke and deceleration of the hammer piston, when the hammer piston runs over the limits of the normal work stroke.

SUMMARY OF THE INVENTION

It is therefore an aim of the present invention to provide a percussive action machine having a sufficiently reliable and structurally simple means for decelerating a hammer, capable of being adapted for use in a high power impact unit, and ensuring high machine reliability and long service life.

The aims of the invention are attained by that in a percussive action machine for changing the shape of a solid object comprising a housing accommodating a hammer capable of reciprocations therein and having a front portion provided with a tool for impact engagement with the solid object to be crushed, a tail piece with a piston-like projection inside a power cylinder attached to the housing and filled with a compressible fluid, and a midportion provided with an annular projection disposed inside a hammer decelerating cavity of the housing occupied by a non-compressible liquid fluid, the front part of this cavity being a hammer deceleration chamber per se having a cross-sectional area substantially equal to the cross-sectional area of the annular projection of the hammer, and comprising, inter alia, a drive for executing the return stroke of the hammer including hydraulic cylinders secured at the periphery of the housing, rods of these hydraulic cylinders entering by ends thereof hydraulic interiors of their cylinders, other ends of these rods entering the interior of said power cylinder to be connected to a grip mechanism adapted for engagement with the piston-like projection of the hammer for executing the return stroke, according to the invention, a side surface of the hammer decelerating chamber and/or that of the annular projection is tapered with the larger base of the taper facing the side opposite to the travel path of the hammer as it decelerates, whereas the length of the tapered surface is not less than the length of the deceleration travel of the hammer.

The proposed machine has a quite simple means for decelerating the hammer and featuring favourable power characteristics (viz., the deceleration force of the hammer remains practically invariable through the hammer deceleration travel), which results in less substantial loads exerted on the elements of the machine to thereby improve its reliability and increase its service life.

Advantageously, the hammer deceleration chamber is provided with a movable cup the bottom of which has a hole or bore wherethrough the hammer extends, and through holes extending to the outer surface of the cup bottom capable of being brought into close contact with an end wall of the hammer deceleration chamber, the cup being also capable of limited displacement relative to the housing.

This arrangement facilitates occupation of the hammer deceleration chamber by the liquid at the initial moment of the return stroke of the hammer, and ensures continuous coaxiality of the annular projection of the hammer and deceleration chamber, which results in the maintenance of optimum conditions for decelerating the hammer through extensive operation time of the machine.

When the machine is provided with a deceleration cup, the end wall of the hammer deceleration chamber and/or the outer surface of the cup bottom is preferably provided with an annular recess embracing the hammer, the outer surface of the cup bottom having radial passages communicating the annular recess with the hammer deceleration chamber, whereas the through holes in the cup bottom are spaced from the annular recess and from the radial passages.

The provision of the annular recess and radial passages further facilitates occupation of the hammer deceleration chamber by the liquid at the initial stage of the return stroke of the hammer, and protects the sealing element, which seals the annular clearance between the housing and front part of the hammer from the effect of high pressure of liquid arising in the hammer deceleration chamber as the hammer decelerates.

It is further possible for the hammer deceleration chamber and interiors of the hydraulic cylinders of the hammer return drive to communicate therebetween and form an integrated hydraulic chamber so that the ends of the rods of the hydraulic cylinders be extended to this integrated hydraulic chamber.

Such integration of the interiors simplifies the machine structurally and reduces the quantity of lines and means for communicating the flows of the liquid fluid. Concurrently, the presence of the liquid fluid in the hammer decelerating, more particularly in the integrated hydraulic chamber, is guaranteed during operation of the machine. This also improves the reliability of the machine and simplifies it structurally.

BRIEF DESCRIPTION OF THE DRAWINGS

Other objects and attending advantages of the present invention will become more fully apparent from a specific embodiment thereof taken in conjunction with the accompanying drawings, in which.

BEST MODE OF CARRYING OUT THE INVENTION

Figure 1:
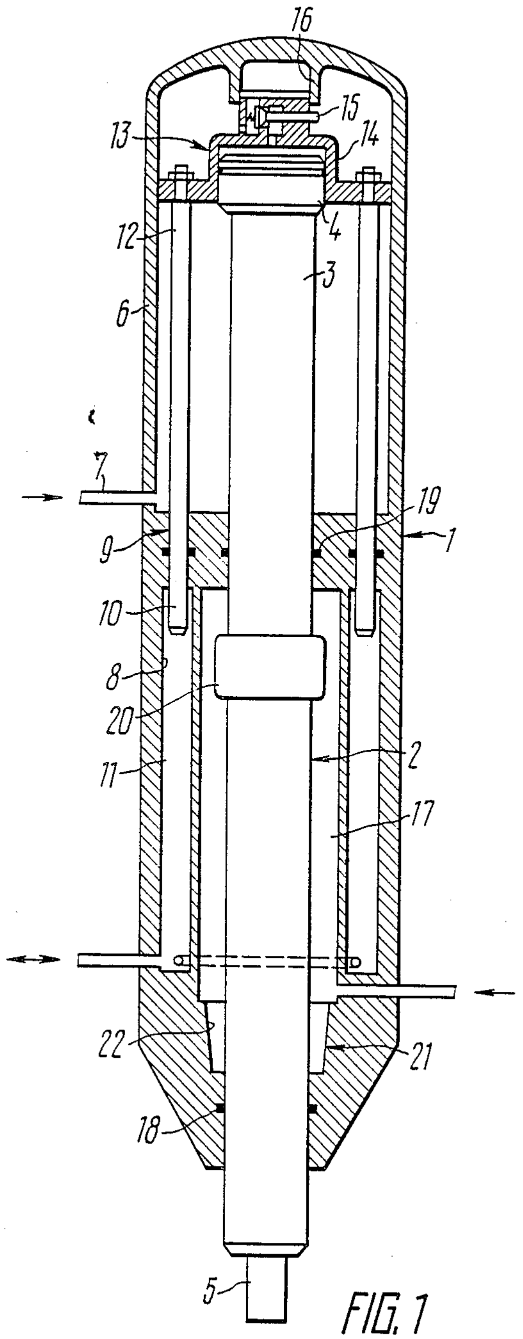
FIG. 1 is a longitudinal sectional view of a percussive action machine with a hammer deceleration chamber and an annular projection on the hammer, the side surface of the hammer deceleration chamber being tapered.

A schematic illustrating a longitudinal sectional view of the herein proposed percussive action machine is represented in FIG. 1.

The machine according to the invention comprises a housing 1 accommodating a reciprocating hammer 2 having a tail piece 3 with a piston-like projection 4 at its end, and a front end with a tool 5 intended to deliver impacts to a solid object to be crushed. Attached to the housing 1 is a power cylinder 6 for the tail piece 3 with the piston-like projection to occupy the interior of the power cylinder 6. The power cylinder 6 is provided with a means 7 to be filled with a compressible fluid (such as a gas) under pressure. The pressure of fluid occupying the power cylinder 6 depends on the structural features of the proposed machine and desired power of an single pulse (impact). The fluid occupying the power cylinder 6 is aimed at accumulating the energy, when it is additionally compressed in the course of the reverse stroke of the hammer 2, and transmitting the thus stored energy to the hammer 2 by acting on the end face of the tail piece 3 during the work stroke thereof. The fluid occupying the power cylinder 6 functions as a compression spring not to be expended during operation of the machine, and therefore replenising the power cylinder 6 with the fluid is necessitated as this fluid leaks through sealing elements.

The percussive action machine according to the invention also has a drive for effecting the reverse stroke of the hammer 2, this drive comprising hydraulic cylinders 8 with rods 9 ends 10 of which are adapted to enter interior 11 of these hydraulic cylinders 8, while other ends 12 of the rods 9 extend to the interior of the power cylinder 6, where they are connected to a grip mechanism 13. In the embodiment under discussion the grip mechanism 13 has a cup member 14 with a spring-loaded value 15. The rear wall of the power cylinder has a cam 16 for opening the valve 15 at the end of the return stroke of the hammer 2.

The above described grip mechanism is not exhaustive of all possible mechanisms of this type applicable to the proposed machine, and does not impose limitations as the spirit and scope of the present invention.

Apart from the aforedescribed, the drive for executing the return stroke of the hammer 2 includes a source of liquid fluid to be delivered to the interiors 11 of the hydraulic cylinders 8 for effecting the reverse stroke of the hammer 2, a line for evacuating the spent liquid fluid from the interiors 11 as the grip mechanism 13 moves after the hammer 2 subsequent to the work stroke thereof, and a means for alternately communicating the interiors 11 with the source of liquid fluid and the line for evacuating the spent liquid fluid (not shown).

The percussive action machine according to the invention is further provided with a means for decelerating the movement of the hammer 2 intended to stop the latter as it executes an idle stroke, when the tool 5 of the hammer 2 fails to meet an obstacle at the end of its forward stroke, or when the hammer 2 fails to spend all its energy during its work stroke.

The hammer decelerating means comprises a cavity 17 inside the housing 1 having a length greater than the work stroke of the hammer and filled with a practically non-compressible liquid fluid, this cavity 17 being pressure-sealed from the outside by a first annular seal 18 and from the interior of the power cylinder 6 by a second annular seal 19. These sealing elements embrace the hammer and prevent leaks of the liquid fluid from the cavity 17 through a clearance between the housing 1 and hammer 2. The midportion of the hammer 2 has an annular projection 20 inside the cavity 17. The cross-sectional area of the main part of the cavity 17 throughout the work stroke of the hammer 2 is substantially greater than the diameter of the annular projection 20 of the hammer 2. The front part of the cavity 17 represents a hammer deceleration chamber 21, a side surface 22 of the deceleration chamber 21 being tapered so that the greater cone base faces the side opposite to the direction of travel of the hammer 2 during its deceleration, the length of the tapered surface being not less than the length of deceleration path of the hammer 2. Also provided are means (not shown) for filling the cavity 17 with the non-compressible liquid fluid. Alternatively, the side surface 22 of the deceleration chamber 21 can be cylindrical, whereas the side surface of the annular projection 20 can be tapered.

Such a construction of the hammer deceleration means obviates all movable elements except the hammer 2 per se, which makes the machine structurally simpler, whereas the tapered side surface 22 provides a sufficiently low deceleration force and relatively high uniformity of deceleration through the length of travel required for decelerating the hammer 2.

If the proposed machine operates with a sufficiently high frequency of impacts, then due to the increased speed of the return stroke of the hammer 2 at the start of the return stroke subsequent to the preceding deceleration extra loads are exerted on the grip mechanism and other elements of the return stroke drive of the hammer 2. These loads arise due to that a flow restricting clearance between the side surfaces of the deceleration chamber 21 (FIG. 1) and annular projection 20 of the hammer 2 provides a substantial pressure differential as the liquid fluid occupies the deceleration chamber 21 during the fast movement of the hammer 2 in its return stroke.

Figure 2:
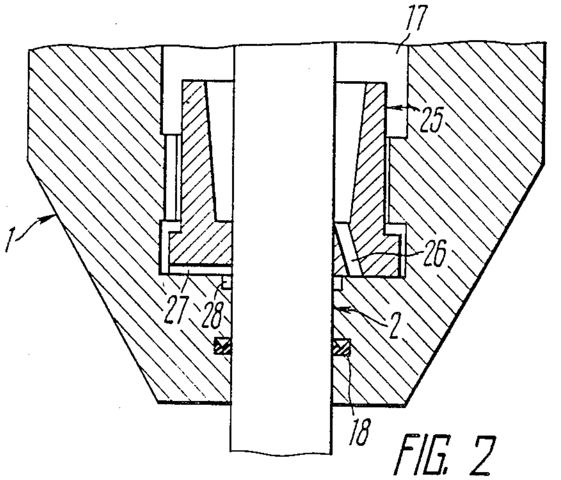
FIG. 2 shows an enlarged view of the front part of the housing and front portion of the hammer deceleration chamber provided with a cup capable of limited displacement.

With reference to FIG. 2, there is shown a deceleration chamber for percussive machines operating at high impact frequencies. This chamber has the form of a cup 25 with the body of the hammer 2 extending through the axis of the cup 25. The bottom of the cup 25 has one or more holes 26 for filling the cup 25 with the liquid fluid at the start of the reverse stroke of the hammer 2, the outer side thereof having radial passages 27, whereas the front wall of the cavity 17 has an annular recess 28 surrounding the hammer 2. The recess 28 and radial passages 27 are so arranged as not to intersect the holes 26. The cup 25 is capable of limited displacement axially and transversely of the hammer 2 relative to the housing 1.

The movable deceleration cup 25 ensures a more efficient operation of the hammer deceleration means during the work and deceleration strokes of the hammer 2, as compared with the previously described modification of the proposed percussive action machine. This is accounted for by that the function of the deceleration means is not affected by the wear of guide elements of the hammer 2 in the course of the service life of the machine.

The ability of the cup 25 to move in the axial direction ensures easy occupation of its interior by the liquid fluid even at a sufficiently high velocity of the hammer 2 as it initiates its return stroke.

The annular recess 28 at the wall of the cavity 17 and radial passages 27 at the outer surface of the bottom of the cup 25 provide protection of the sealing element 18 from the effect of high pressure of the liquid fluid arising in the cup 25 as the hammer 2 decelerates, and facilitate occupation of its interior by the liquid fluid as the hammer 2 initiates its reverse stroke.

In view of the aforedescribed, this technical solution, while not affecting the performance of the proposed machine, ensures a more reliable operation at high impact frequencies.

The proposed machine and service lines are further structurally simplified by integrating the interiors of the hydraulic cylinders and deceleration cavity into a single hydraulic chamber 29. (FIG. 3) so that the ends 10 of the rods 9 extend to this chamber 29.

This integration of the cavities simplifies the machine structurally and promotes a more reliable operation.

The proposed percussive action machine will be discussed in operation with reference to one of the embodiments thereof as represented in FIG. 1.

FIG. 1 illustrates the machine according to the invention in a position when the hammer 2 terminates its return stroke. At this point the liquid fluid is fed under pressure from a source (not shown) of liquid fluid to the interiors 11 of the hydraulic cylinders 8 to force the rods 9 in a direction away from the solid object being crushed (viz., upwards as seen in FIG. 1). The rods 9 act on the cup 14 of the grip mechanism 13 to move it in the same direction, which is accompanied by an underpressure inside the cup 14 into which the piston-like projection 4 of the hammer 2 enters. Under the action of pressure of the compressible fluid exerted on the front end of the piston-like projection 4, the hammer 2 is caused to move after the cup 14 of the grip mechanism 13. This movement of the rods 9, grip mechanism 13, and hammer 2 continues until the tappet of the spring-loaded valve 15 is brought into contact with the cam 16.

The cam 16 causes the valve 15 to open, the pressure of the compressible fluid in the interior of the cup 14 and power cylinder 6 equalizes, and under the action of this pressure exerted on the end face of the tail piece 3 the hammer 2 accelerates forward to the point of delivering an impact by the tool 5 on a solid object being crushed. The hammer 2 then stops and its work stroke is terminated.

At the same time, as soon as the hammer 2 disengages from the grip mechanism 13, the interiors 11 are disconnected from the source of liquid fluid and connected to the liquid fluid discharge line. The pressure of the compressible fluid present in the power cylinder 6 acts on the other ends 12 of the rods 9 for the latter to move forward and force the liquid fluid from the interiors 11 of the hydraulic cylinders 8 to the liquid fluid discharge line. The grip mechanism 13 moves forward together with the rods 9.

After the cup 14 of the grip mechanism 13 reaches the piston-like projection 4, the latter, while entering the interior of the cup 14, starts to additionally compress the compressible fluid present therein for this fluid under an overpressure to open the valve 15 and escape therethrough from the interior of the cup 14 to the interior of the power cylinder 6 until the bottom of the cup 14 is thrust against the end face of the tail piece 3 of the hammer 2. At this point the grip mechanism 13 stops, and the valve 15 is closed by its spring.

Subsequent to stopping the grip mechanism 13 the interiors 11 of the hydraulic cylinders 8 are disconnected from the fluid discharge line and connected to the source of liquid fluid for the rods 9 to move away from the solid object being crushed, whereupon the cycle is repeated in the manner heretofore described.

In the proposed machine, as in other prior art machines of this type, the deceleration means idles as the hammer 2 executes its work stroke. Because the cross-sectional area of the cavity 17 is substantially greater than the diameter of the annular projection 20, the latter in its joint movement with the hammer 2 (during the return and work strokes) does not encounter a tangible resistance and does not hamper the travel of the hammer 2.

The hammer deceleration means functions only when the hammer 2 in the course of its work stroke fails to encounter a solid obstacle by its front portion with the tool 5, or fails to completely expend its energy to change the shape of such an obstacle. The movement of the hammer 2 forward subsequent to termination of the work stroke causes the annular projection 20 to enter the hammer deceleration chamber 21 and confine therein a quantity of the non-compressible liquid fluid. During a subsequent movement the liquid fluid is forced from the hammer deceleration chamber 21 to the cavity 17 through the flow restricting clearance between the side surface of the annular projection 20 and tapered wall 22 of the deceleration chamber 21. Such a restriction in the flow of the non-compressible liquid fluid causes an increase in pressure inside the deceleration chamber 21, which acts on the front end of the annular projection 20 to decelerate the movement of the hammer 2 until it stops.

In the course of deceleration the hammer 2 slows down, which is accompanied by a reduction in the amount of clearance between the side surface of the annular projection 20 and tapered wall 22. The thus reduced clearance allows to maintain invariable the pressure of liquid fluid in the hammer deceleration chamber 21 through the length of deceleration travel of the hammer 2, which in turn results in a reduction of loads exertable on the elements of the machine during hammer deceleration.

As the hammer 2 reverses its movement, thanks to that the speed of the return stroke of the hammer 2 is substantially less than the speed of the work stroke, the negligeable flow restricting clearance between the side surfaces (viz., of the hammer deceleration chamber 21 and annular projection 20) fails to produce much resistance to the travel of the hammer 2.

Operation of the modified form of the proposed percussive action machine (FIG. 2) in which the hammer deceleration chamber is provided with the cup 25 capable of limited displacement, having a hole in the bottom thereof for the passage of the hammer 2 and through holes 26, as well as having radial passages 27 at the outer surface thereof adapted for tight engagement with the front wall of the cavity 17, is generally similar during the work and deceleration strokes to the manner in which the previously described machine modification operates. As the hammer 2 decelerates, part of the liquid fluid is caused by the action of high pressure produced inside the cup 25 to leak through the clearance between the side surface of the hammer 2 and the inside surface of the hole in the bottom of the cup 25 to enter the annular recess 28, wherefrom the liquid escapes along the passages 27 to the cavity 17. In this manner the sealing element 18 is protected from the action of the high pressure of liquid fluid induced inside the cup 25.

When after deceleration and at the start of the return stroke the hammer 2 moves at a sufficiently high speed, reverse flow of the liquid fluid from the main part of the cavity 17 to the interior of the cup 25 (FIG. 2) takes place. The pressure of liquid in this cup 25 becomes less pronounced than that in the cavity 17. The pressure of liquid fluid acts on the outer surface of the bottom of the cup 25 and causes this cup 25 to move rearwards and follow the movement of the hammer 2 to thereby open the through holes 26 for the liquid fluid to pass along these holes and occupy the interior of the cup 25. Therewith, the radial passages 27 act to further reduce resistance to the flow of liquid entering the cup 25, thereby reducing resistance to the travel of the hammer 2 as it initiates its return stroke.

In the subsequent travel of the hammer 2 forward, that is when the hammer 2 executes the work stroke, the cup 25 is caused by the forces of friction to also move forward until engagement by its bottom with the housing 1 to thereby close the through holes 26 and get ready for a possible deceleration of the hammer 2. Therefore, for percussive action machines operating at high impact frequencies the cup 25 facilitates machine operation and improves machine reliability.

Figure 3:
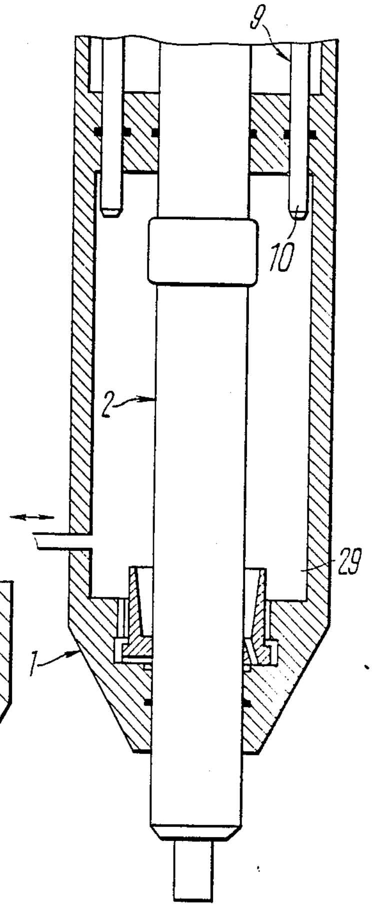
FIG. 3 illustrates the front part of the proposed machine in which the hammer deceleration chamber communicates (integrated) with the interiors of the hydraulic cylinders of the hammer return stroke drive, the front portion of the hammer deceleration chamber being provided with a cup capable of limited displacement.

With reference to FIG. 3 of the accompanying drawings, the machine having an integrated hydraulic chamber 29 operates substantially similarly to what has been described heretofore. It is to be noted, however, that the hammer decelerating chamber is filled with the liquid fluid in the course of the very first cycle of the return stroke of the hammer to completely prevent machine operation in the absence of liquid in the hammer deceleration chamber. In view of the aforegoing, along with an obvious simplification of the percussive machine construction, machine operation becomes more reliable.

INDUSTRIAL APPLICABILITY

The present invention can be used in designing high-impact-power hydraulic-pneumatic hammers for cracking outside bulks of rock formations or other rock-like materials, for demolishing walls and foundations of old buildings, and other civil engineering structures.

For example, a hydropneumatic hammer embodying the features of the present invention and having an impact energy of up to 100 kJ is capable of cracking the hardest rock formations (such as diabasic porphyrite) several cubic meters in volume within 1 or 2 strikes.

The proposed machine is highly efficient and reliable in operation.

We claim:

1. A percussive action machine for changing the shape of solid objects comprising a housing (1) accommodating a hammer (2) capable of reciprocations therein and having a front portion provided with a tool (5) for impact engagement with the solid object to be crushed, a tail piece (3) with a piston-like projection (4) inside a power cylinder (6) attached to the housing (1) and filled with a compressible fluid, and a midportion provided with an annular projection disposed inside a hammer decelerating cavity (17) of the housing (1) occupied by a non-compressible liquid fluid, the front part of this cavity being a hammer deceleration chamber (21) per se having a cross-sectional area substantially equal to the cross-sectional area of the annular projection (20) of the hammer (2), a side surface of the hammer deceleration chamber (21) and/or that of the annular projection (20) is tapered with the larger base of the taper facing the side opposite to the travel path of the hammer (2) as it decelerates, whereas the length of the tapered surface is greater than the length of the deceleration travel of the hammer (2), and comprising, inter alia, a drive for executing the return stroke of the hammer (2) including hydraulic cylinders (8) secured at the periphery of the housing (1), rods (9) of these hydraulic cylinders (8) entering by ends (10) thereof hydraulic interiors (11) of their cylinders (8), other ends (12) of these rods (9) entering the interior of said power cylinder (6) to be connected to a grip mechanism (13) adapted for engagement with the piston-like projection (4) of the hammer (2) for executing the return stroke, characterized in that the hammer deceleration chamber (21) is provided with a movable cup (25) the bottom of which has a hole wherethrough the hammer (2) extends, and through holes (26) extending to the outer surface of the cup bottom capable of being brought into close contact with an end wall of the hammer deceleration chamber (21), the cup (25) being also capable of limited displacement relative to the housing (1).

2. A machine as claimed in claim 1, characterized in that the end wall of the hammer deceleration chamber (21) and/or the outer surface of the cup bottom is provided with an annular recess (28) embracing the hammer (2), the outer surface of the cup bottom having radial passages (27) communicating the annular recess (28) with the hammer deceleration chamber (21), whereas the through holes (26) in the bottom of the cup (25) are spaced from the annular recess (28) and from the radial passages (27).

3. A machine as claimed in claim 1, characterized in that the hammer deceleration chamber (17) and interiors (11) of the hydraulic cylindres (8) of the hammer return stroke drive communicate therebetween and form an integrated hydraulic chamber (29) so that the ends of the rods (9) of the hydraulic cylinders (8) extend to this integrated hydraulic chamber (29).

* * * * *